United States Patent
Godano et al.

(10) Patent No.: US 10,427,625 B2
(45) Date of Patent: Oct. 1, 2019

(54) AUTOMOBILE PART FOR ACOUSTIC SCREENING AND ITS PRODUCTION PROCESS

(71) Applicants: AUTONEUM MANAGEMENT AG, Winterthur (CH); Philippe Godano, Winterthur (CH)

(72) Inventors: Philippe Godano, Winterthur (CH); Raphael Merrien, Winterthur (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 268 days.

(21) Appl. No.: 15/529,306

(22) PCT Filed: Nov. 24, 2015

(86) PCT No.: PCT/EP2015/077542
§ 371 (c)(1),
(2) Date: May 24, 2017

(87) PCT Pub. No.: WO2016/083398
PCT Pub. Date: Jun. 2, 2016

(65) Prior Publication Data
US 2017/0259757 A1    Sep. 14, 2017

(30) Foreign Application Priority Data
Nov. 25, 2014 (FR) ..................................... 14 61424

(51) Int. Cl.
*B60R 13/08* (2006.01)
*B60N 3/04* (2006.01)

(52) U.S. Cl.
CPC .......... *B60R 13/0853* (2013.01); *B60N 3/042* (2013.01); *B60R 13/083* (2013.01)

(58) Field of Classification Search
CPC .............. B60R 13/083; B60R 13/0838; B60R 13/0846; B60R 13/0853
See application file for complete search history.

(56) References Cited

U.S. PATENT DOCUMENTS

| | | | | |
|---|---|---|---|---|
| 4,083,595 A * | 4/1978 | Maier | ................. | B60R 13/0846 296/39.3 |
| 6,951,263 B2 * | 10/2005 | Blomeling | ............ | B29C 43/203 181/204 |

(Continued)

FOREIGN PATENT DOCUMENTS

| | | |
|---|---|---|
| DE | 195 08 968 A1 | 9/1996 |
| DE | 201 20 923 U1 | 6/2002 |

(Continued)

OTHER PUBLICATIONS

International Search Report and Written Opinion prepared by the European Patent Office dated Jan. 29, 2016, for International Application No. PCT/EP2015/077542.

*Primary Examiner* — Jeremy A Luks
(74) *Attorney, Agent, or Firm* — Lewis Brisbois Bisgaard & Smith LLP

(57) ABSTRACT

An automobile part (11) for acoustic screening makes it possible to insulate a passage of a through unit (10). The automobile part (11) for acoustic screening is a part (11) in a single piece with different areas of density and/or rigidity, such as to constitute lips (12, 13) at the through passage of the mobile unit (10).

23 Claims, 5 Drawing Sheets

(56) References Cited

U.S. PATENT DOCUMENTS

| | | | | |
|---|---|---|---|---|
| 6,981,737 | B2* | 1/2006 | Welsh | B60H 1/00571 |
| | | | | 296/187.02 |
| 8,276,710 | B2* | 10/2012 | Soltau | B29C 44/0407 |
| | | | | 181/284 |
| 8,701,825 | B2* | 4/2014 | Yamamoto | E04B 1/8409 |
| | | | | 181/284 |
| 8,888,174 | B2* | 11/2014 | Roggenkamp | F02M 35/1294 |
| | | | | 296/208 |
| 2005/0046217 | A1* | 3/2005 | Campbell | B60R 13/0846 |
| | | | | 296/39.3 |
| 2005/0046218 | A1* | 3/2005 | Campbell | B60R 13/0846 |
| | | | | 296/39.3 |
| 2008/0264555 | A1* | 10/2008 | Blomeling | B29C 43/146 |
| | | | | 156/245 |
| 2011/0017011 | A1* | 1/2011 | Beyer | B60K 26/02 |
| | | | | 74/566 |

FOREIGN PATENT DOCUMENTS

| | | |
|---|---|---|
| DE | 101 43 167 A1 | 3/2003 |
| DE | 10 2007 02083 A1 | 11/2008 |
| FR | 3 010 026 A1 | 3/2015 |
| FR | 3 012 557 A1 | 5/2015 |

* cited by examiner

AUTOMOBILE PART FOR ACOUSTIC SCREENING AND ITS PRODUCTION PROCESS

CROSS REFERENCE TO RELATED APPLICATIONS

This application is a national stage application under 35 U.S.C. 371 and claims the benefit of PCT Application No. PCT/EP2015/077542 having an international filing date of 24 Nov. 2015, which designated the United States, which PCT application claimed the benefit of French Patent Application No. 1461424 filed 25 Nov. 2014, the disclosure of each of which are incorporated herein by reference.

TECHNICAL FIELD

The invention relates to an automobile part for acoustic screening which permits the passage of a mobile or static unit between the source of noise and the receiver.

The invention also relates to a process for production of an automobile part for acoustic screening which permits the passage of a mobile or static unit between the source of noise and the receiver.

The engine compartment is a significant source of noise, necessitating reduction of the transmission of noise towards the interior of the passenger compartment.

For this purpose, acoustic insulating materials are placed inside door panels, on the floor of the passenger space, inside the dashboard, and, above all, between the engine compartment and the passenger compartment of the automobile there is an insulation part commonly known as inner dash insulation.

In FIG. 1, a floor 100 of the passenger space is covered with a floor carpet 1 with acoustic properties. The separation wall between the engine compartment and the passenger compartment of the automobile is covered with inner dash insulation 3 with acoustic properties. This inner dash insulation 3 with acoustic properties extends inside the dashboard 4 as far as the floor 100 of the passenger space, and under the floor carpet 1.

Between the inner dash insulation 3 and the dashboard 4, there is a hollow space or a cavity 5 in which there are located accessories which are known and not represented in detail, such as the heating and air conditioning unit, as well as various pipes. This hollow space 5 is generally noisy because of the transmission of the engine noise through the inner dash and acoustic leakages from the passages and acoustic effects on the rigid inner walls of the dashboard 4. The dashboard 4 is generally open in the lower part, the cavity 5 thus being connected to the passenger compartment.

In this case, the acoustic insulation between the engine compartment and the passenger compartment of the automobile is weakened. Reduction of the noise transmitted between the engine compartment and the passenger compartment of the automobile is obtained by means of a well-known technique, in particular by interposition of a part 6 known as the "hush panel" by the specialists. These parts 6 which are placed below the dashboard 4 and above the feet of the driver and front passenger are used to block the opening between the dashboard 4 and the inner dash insulation 3, and constitute means for acoustic screening.

This well-known technique encounters difficulties however when a static unit such as, for example, a transmission cable, or a mobile unit such as a pedal assembly passes through the acoustic screening means.

In FIG. 1, a pedal assembly 2 which passes through the acoustic screening means 6 comprises a support 7 and an articulation 8 in the vicinity of the inner dash and the engine compartment, a pedal 9 in the passenger compartment, and a pedal lever 10 which passes through the hush panel 6.

The invention is particularly advantageous in its application to the production of these parts 6 known as "hush panels" by the specialists.

A first technique, which is well known and conventional for producing these automobile parts for acoustic screening with passage functions, involves associating a lower support structure made of rigid injected plastic material with an upper layer of material which absorbs the noise.

When a static unit, such as a transmission cable, or a mobile unit, such as a pedal, passes through the acoustic screening means, the corresponding passage function must be provided. For this purpose, an opening is created which produces acoustic leakages and downgrades the acoustic insulation of the screen. In order to remedy this, use must be made of specific sealing parts comprising for example thermoformed polyurethane foam assembled on the part made of rigid injected plastic material.

A disadvantage of this prior art is that it needs a complex and costly production process, which requires assembly of a plurality of parts.

In addition, a specific sealing part thus obtained is not only heavy, but also difficult to recycle.

A second technique for producing these automobile parts for acoustic screening with passage functions involves using a thermoformed fibrous material with thick acoustic absorption areas which are very slightly compressed, and have thin, strongly compressed edges next to the through-portions or passages.

This second technique has the advantage of being a light solution.

A disadvantage of this second prior art is however that the specific sealing part thus produced is lacking in rigidity.

In the case of these highly compressed edges next to a mobile unit passage, it is also necessary to avoid any collision as a result of the fitting tolerances, which makes it necessary to leave a substantial gap between the screen 6 and the mobile unit 10 in FIG. 1.

A disadvantage of this second prior art is consequently that the specific sealing part thus produced does not provide the required sealing function at the passages.

A first objective of the invention is to improve the known prior art by providing a new, lighter automobile part for acoustic screening which provides improved insulation for passage of a static or mobile unit, with a required sealing function at certain passages.

A second objective of the invention is to provide a new production process which makes it possible to produce an automobile part for acoustic screening according to the invention, in an economical and ecologically friendly manner.

The subject of the invention is an automobile part for acoustic screening made of fibrous material with different areas of density and/or rigidity, comprising at least one passage of a static or mobile unit, characterised in that the areas with the lowest density are situated next to the passages which pass through the part.

According to other, alternative characteristics of the invention, the material used for the acoustic screening part according to the invention is preferably a felt made of thermoplastic material comprising bonding fibres and optionally filling fibres. The bonding fibres can be selected from a group comprising single-component fibres or two-component fibres, wherein the components can be a polyester, in particular a polyethylene terephthalate (PET), a polyolefin, in particular a polypropylene or a polyethylene, a polylactic acid (PLA) or a polyamide (PA), in particular a polyamide 6 or a polyamide 6.6. The percentage of the bonding fibres relative to the total weight of the material is preferably between 20 and 100%.

The filling fibres can be synthetic fibres or natural fibres, preferably fibres which are recycled or derived from a material obtained from a recycling process. The recycled fibres are preferably comprised in the group comprising: a reprocessed (shoddy) cotton, a reprocessed (shoddy) synthetic material, a reprocessed (shoddy) polyester or reprocessed (shoddy) natural fibres. The reprocessed natural fibres represent at least 51% by weight of the filling material, whereas 49% of the filling material can be composed by fibres derived from other sources. A reprocessed polyester contains for example 51% by weight of polyester-based material.

The reprocessed material can also be a mixture of natural and synthetic fibres, without predominance of one of the two types. The fibres can be short fibres or filaments with an unspecified length. The filling fibres can be synthetic, preferably made of polyester, for example polyethylene terephthalate. A preferred material for the production of the automobile part according to the invention can be produced by a combination of two-component polyester comprising bonding fibres and a polyester filling. This arrangement permits easy recycling of the automobile part according to the invention.

Additional layers can be provided on the top or the bottom of the automobile part, in particular non-woven decorations, or decorative covering coatings.

The automobile part for acoustic screening according to the invention is a fibrous part in a single piece in which the areas of lowest density are situated next to units which pass through the part, thus reducing or eliminating the gap between the said unit and the screen.

With a reduced gap and absorption at the edges of the opening, there is improvement of the acoustic performance of the screen in the presence of the through units.

The form of the screen can be defined such that the low-density edge of the screen is at least partially in contact, with or without deformation of the edge, with the through unit, when the unit and the screen are fitted on the vehicle.

In the case when the through unit is mobile, the cut-out in the screen must permit full movement of the unit, either by means of a minimum gap which is preferably constant around the unit, or by means of a limited force in the event of contact.

When the cut-out is smaller than the width of the through unit, the part is deformed and the low-density edges bend. In order to be able to control the direction of the bending, it is preferable to create an angle between the low-density edge and the adjacent compressed part of the screen by thermoforming of a side of the low-density edge. This configuration is optimum for the sealing function of the screen in the presence of the unit, and simplifies the fitting.

In the case of a mobile unit, the relative movement between the unit and the low-density edges can be on the plane of the screen or perpendicular to the plane of the screen. In order to minimise the forces perpendicular to the plane of the screen and to prevent bending of the edge and the screen, the form of the flexible edge of the screen is defined in order to make it correspond to the trajectory of the point of contact of the unit.

The thermoforming of a side of the low-density edge reinforces the cohesion between the fibres and prevents fraying of the flexible edge when the thermoformed face is in contact with a unit, in particular a mobile unit.

The automobile part for acoustic screening according to the invention can be constituted by a needled felt with an initial mass surface density of between 500 and 1500 g/m$^2$, and preferably between 600 and 900 g/m$^2$.

The material which constitutes the automobile part for acoustic screening according to the invention can comprise polyester bonding fibres and polyester filling fibres.

The automobile part for acoustic screening according to the invention can comprise an area of articulation of the low-density areas encompassing the passage of a mobile unit.

The invention also relates to a process for production of an automobile part for acoustic screening according to the invention, comprising a step of hot moulding of a blank cut from a flank of material, characterised in that the process comprises a step of hot moulding which prevents heating of the low-density areas, by defining a mould air gap which is larger than the thickness of the flank of material without contact with the tool.

Preferably, in order to create an angle between the low-density edge and the adjacent compressed part of the screen by thermoforming of a side of the low-density edge, according to the invention contact is forced between the flank of material and the hot tool only on a single side of the low-density edge.

The thermoforming time of the part is selected so as to heat only the surface of the low-density edge, but it is sufficient to consolidate the adjacent compressed part of the screen.

The process preferably comprises an intermediate step of removal from the mould and rapid transfer of the hot-moulded blank to a cooling die, before a cutting step which finalises the form and characteristics of the automobile part for acoustic screening according to the invention.

The invention will be better understood by means of the following description provided by way of non-limiting example, with reference to the appended drawings, in which.

Figure 1:
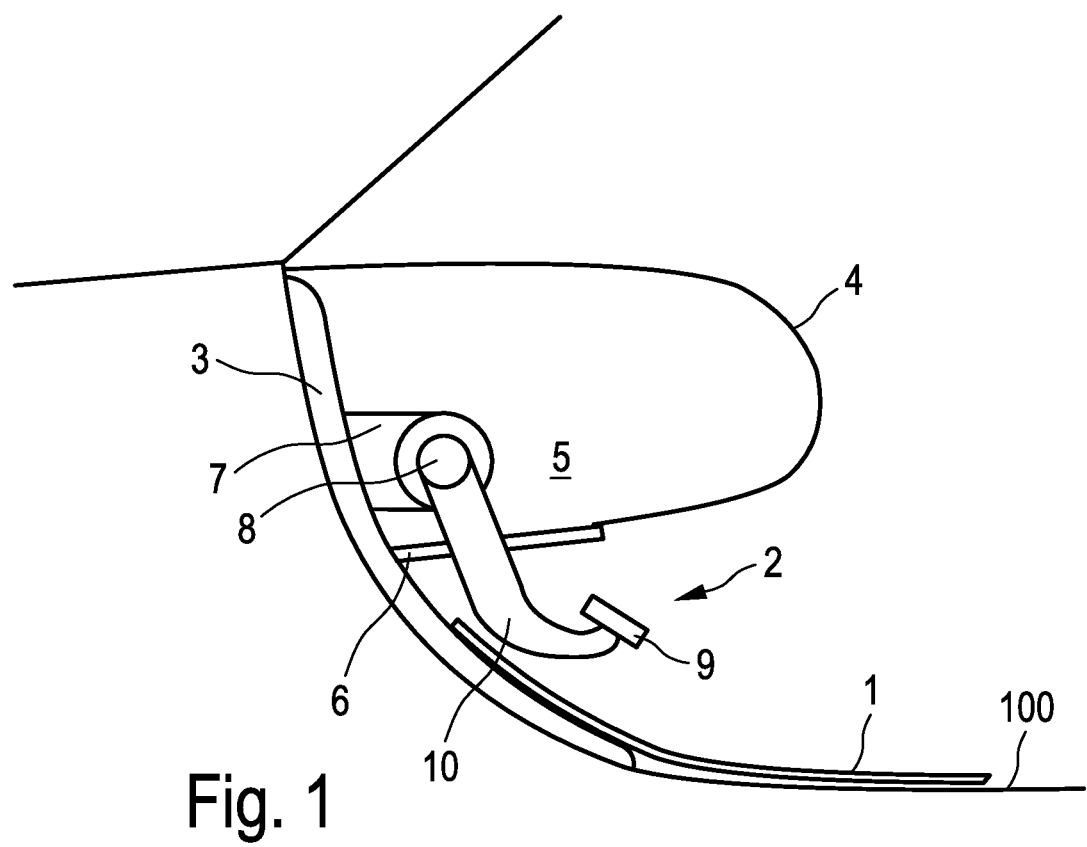
FIG. 1 represents schematically a vehicle passenger space covered with a carpet having acoustic properties.
Figure 2:
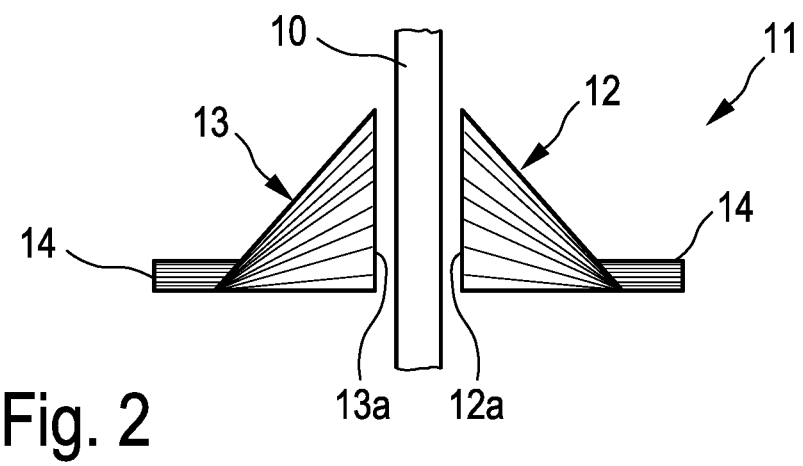
FIG. 2 represents schematically a view in transverse cross-section of a first automobile part according to the invention in interaction with a unit.

In FIG. 2, a first automobile part for acoustic screening according to the invention made of fibrous material, seen in transverse cross-section, is designated as 11 as a whole.

The automobile part 11 is represented in interaction with a mobile unit 10 such as a pedal lever, for example a pedal lever of a clutch or a brake, a pull cable, or any similar unit which is mobile in translation or in rotation.

The automobile part comprises two thick lips or parts which are not compressed 12 and 13 which encompass the pedal lever 10.

The thick lips or parts which are not compressed 12 and 13 are formed by cutting fibrous material via a slit ending in two conformations 12a, 13a which are spaced from the pedal lever 10.

These thick lips or parts which are not compressed 12 and 13 correspond to a low density of material which remains in its inflated state. The central area corresponding to the thick lips or parts which are not compressed 12 and 13 and the slit part has a very low density: it advantageously corresponds to a felt which is not compressed, preferably a needled felt with polyester bonding fibres and substantially polyester filling fibres, with an initial mass surface density of between 500 and 1500 g/m$^2$, and preferably between 600 and 900 g/m$^2$. This material is advantageous in that it permits easy recycling after use and reinsertion in a production process.

The reduced gap between the two conformations 12a, 13a and the pedal lever 10, and the absorption at the edges of the opening ensure good acoustic performance of the screen 11, including at the passage of the pedal lever 10.

The reduced gap between the two conformations 12a, 13a and the pedal lever 10 is preferably constant around the pedal lever 10, and thus permits its free and full movement without contact, and therefore without friction or interfering force.

The central area corresponding to the thick lips or parts which are not compressed 12 and 13 and the slit part is bordered by a compressed border 14 made of the same fibrous material, which is the inverse of the second known technique using a thermoformed fibrous material with thick acoustic absorption areas which are very slightly compressed and thin edges which are highly compressed next to the through-portions or passages of a mobile unit.

By way of example, the central area corresponding to the slit part and to the thick lips or parts which are not compressed 12 and 13 has a maximum thickness of between 5 and 20 mm, whereas the compressed area 14 has a thickness of approximately 1 to 5 mm.

The compressed area or border 14 can form an articulation of the central area, in order to facilitate the passage of the pedal lever 10 during the fitting.

The slit of the central area can also extend as far as the edge of the automobile part 11, in order to facilitate the passage of the pedal lever 10 during the fitting.

Since the lips 12 and 13 are flexible, and correspond to a non-compressed felted part, they are also flexible laterally, such that the acoustic sealing is effective on both sides of the pedal lever 10.

Figure 3:
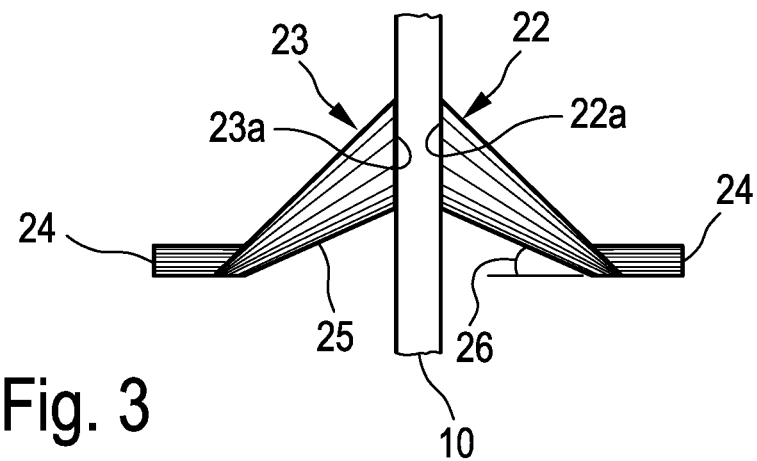
FIG. 3 represents schematically a view in transverse cross-section of a second automobile part according to the invention in interaction with a unit.

In FIG. 3, a second automobile part for acoustic screening according to the invention made of fibrous material, seen in transverse cross-section, is designated as 21 as a whole.

The automobile part 21 is represented in interaction with a mobile unit 10 such as a pedal lever, for example a pedal lever of a clutch or brake, a pull cable, or any similar unit which is mobile in translation or in rotation.

The automobile part 21 comprises two thick lips or parts which are not compressed 22 and 23 which encompass the pedal lever 10.

The thick lips or parts which are not compressed 22 and 23 are formed by cutting fibrous material via a narrow slit which ends in two conformations 22a, 23a in tangential contact with the pedal lever 10.

These thick lips or parts which are not compressed 22 and 23 correspond to a low density of material which remains in its free inflated state with very low density.

The absence of a gap between the two conformations 22a, 23a and the pedal lever 10, and the absorption on the edges of the opening ensure good acoustic performance of the screen 21.

The central area corresponding to the thick lips or parts which are not compressed 22 and 23 and to the slit part is bordered by a compressed border 24 made of the same fibrous material, which is the inverse of the second known technique using a thermoformed fibrous material with thick acoustic absorption areas which are very slightly compressed and thin edges which are highly compressed next to the through-portions or passages of a mobile unit.

By way of example, the central area corresponding to the slit part and to the thick lips or parts which are not compressed 22 and 23 has a thickness of between 5 and 20 mm, whereas the compressed area 24 has a thickness of approximately 1 to 5 mm.

The compressed area or border 24 forms an articulation of the central area, in order to facilitate flexible mobility of the thick lips or parts which are not compressed 22 and 23 during the movement of the pedal lever 10.

The form of the screen 21 is defined such that the low-density area of the screen 21 is at least partially in contact, with deformation of the edge, with the through unit 10, when the unit and the screen are fitted on the vehicle.

The central area corresponding to the slit part has a very low density: it advantageously corresponds to a felt which is not compressed, preferably a needled felt with polyester bonding fibres and polyester filling fibres. This material is advantageous in that it permits easy recycling after use and reinsertion in a production process.

Since the slit between the two conformations 22a, 23a is thinner than the through unit 10, the thick lips or parts which are not compressed 22 and 23 of the part 21 are deformed.

In order to control the direction of these deformations, an angle 26 is created below the conformations 22a, 23a, in tangential contact with the pedal lever 10, by thermoforming of a single side of the low-density area.

This angular configuration which is optimum for the function of sealing of the screen 21 in the presence of the mobile unit 10 also simplifies its fitting.

The thermoforming of a single side of the low-density area reinforces the cohesion between the fibres and prevents fraying of the flexible edges when the thermoformed face is in contact with the mobile unit 10.

The thermoformed face of the automobile part 21 for acoustic screening according to the invention comprises an interface 25 which extends under the bottom and on the inner edges of the lips 22 and 23, coming into contact with the pedal lever 10.

This interface 25 is a resistant interface with an anti-abrasion function during the movement of the pedal lever 10 in contact with the lips 22 and 23.

This interface 25 is glazed on its surface, so as to permit sliding and good resistance of the lips 22 and 23 in contact with the pedal lever 10, and to prevent fraying of the lips 22 and 23 by the friction of the pedal lever 10.

The sliding of this interface 25 on the mobile unit 10 thus prevents damage to the outer and upper parts of the thick lips 2 and 3 corresponding to a felt which is not compressed on its surface, and produces a limited contact force on the movement of the pedal lever 10.

Figure 4:
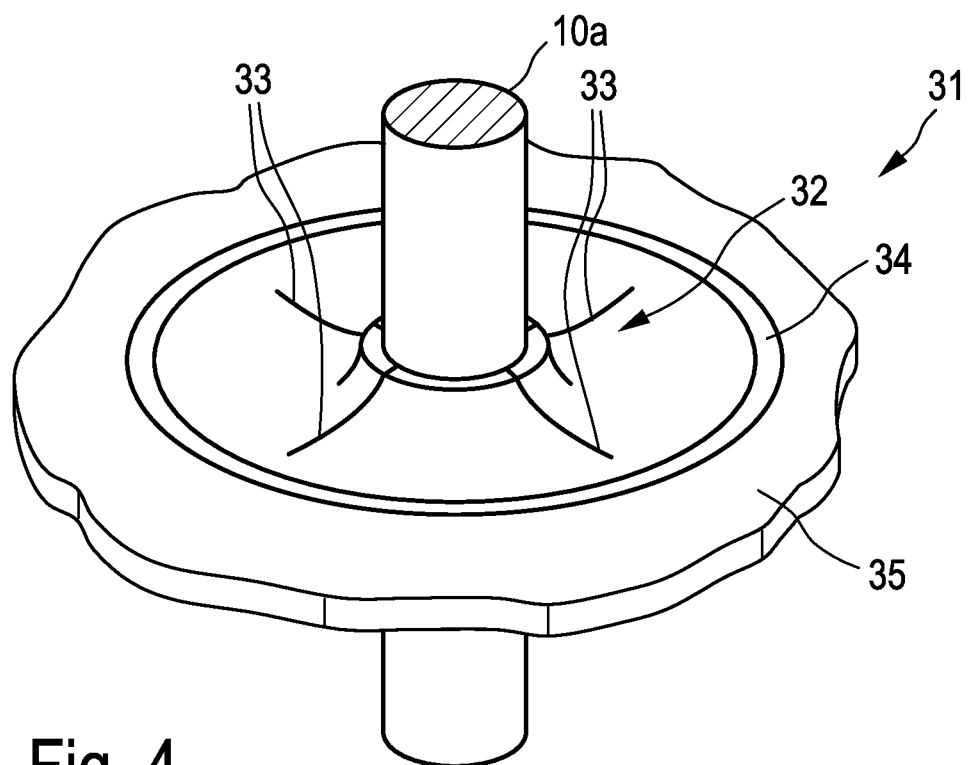
FIG. 4 represents schematically a view in perspective of a third automobile part according to the invention in interaction with a fixed unit.

In FIG. 4, a third automobile part for acoustic screening according to the invention is designated as 31 as a whole.

The automobile part 31 is represented in interaction with a fixed unit 10*a* such as a cable.

The automobile part comprises a thick central area 32 which encompasses the cable 10*a*. This thick central area 32 corresponds to a low density of non-compressed fibrous material. Contiguous slits 33 are provided in the material of the thick central area 32. The thick central area 32 is conformed so as to provide good flexibility during fitting of the cable 10*a*, whilst ensuring good sealing around the cable 10*a* after fitting.

The central area 32 has a very low density: it advantageously corresponds to a non-compressed felt, preferably a needled felt with polyester bonding fibres and polyester filling fibres. This material is advantageous in that it permits easy recycling after use and reinsertion in a production process.

The central area 32 is bordered by a first compressed peripheral area 34. The first peripheral area 34 is compressed so as to constitute a retention unit for the thick central area 32 around the cable 10*a*. By way of example, the thick central area 32 has a thickness of between 5 and 20 mm, whereas the compressed area 34 has a thickness of approximately 1 to 2 mm.

The first peripheral area or peripheral border 34 which surrounds the central area 32 is bordered by a second compressed peripheral area 35, typically with a thickness of between 2 and 5 mm.

This second peripheral area 35 can be used to secure the automobile part 31 according to the invention in position, so as to constitute an under-dashboard.

Figure 5:
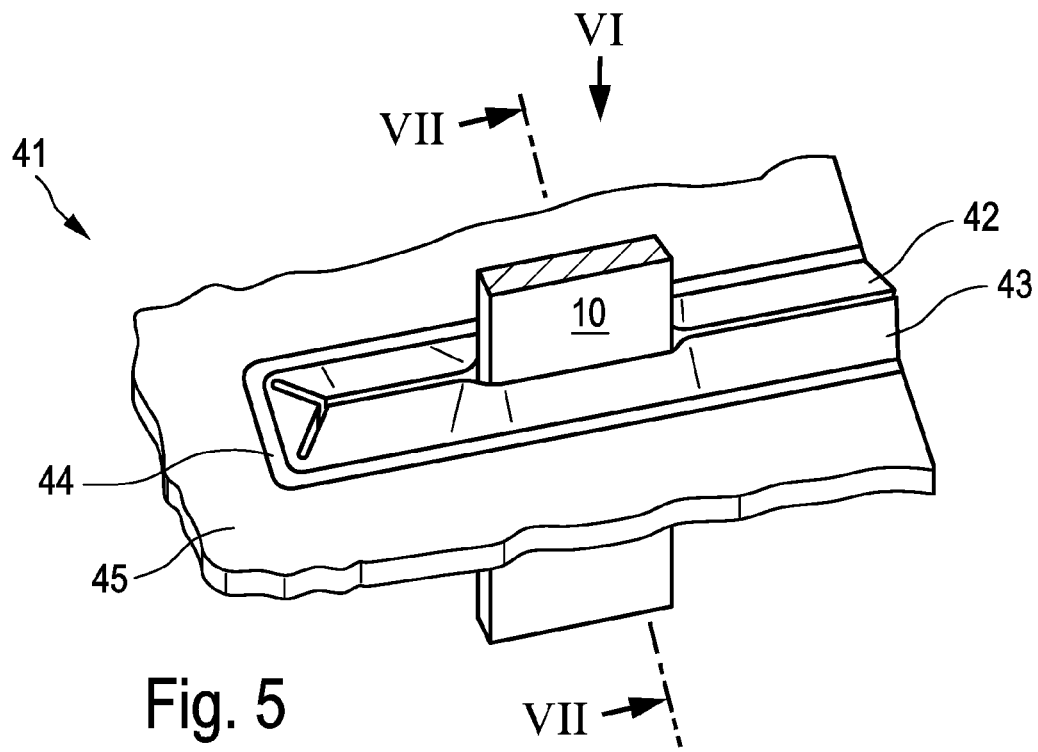
FIG. 5 represents schematically a view in perspective of a fourth automobile part according to the invention in interaction with a mobile unit.
Figure 6:
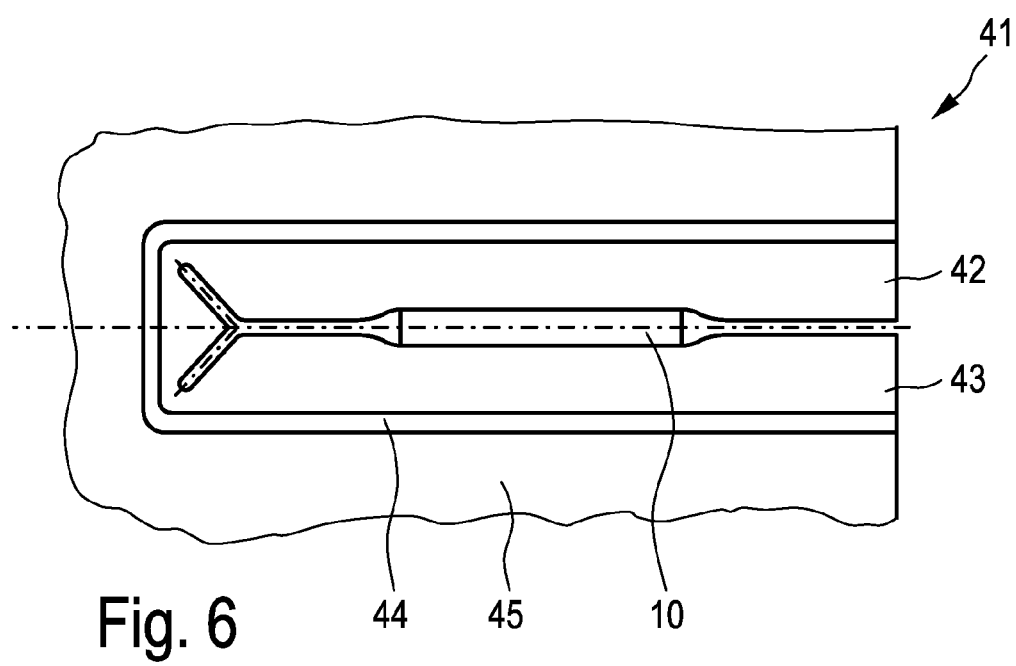
FIG. 6 represents schematically a view from above according to the arrow VI in FIG. 5 of an automobile part according to the invention in interaction with a mobile unit.
Figure 7:
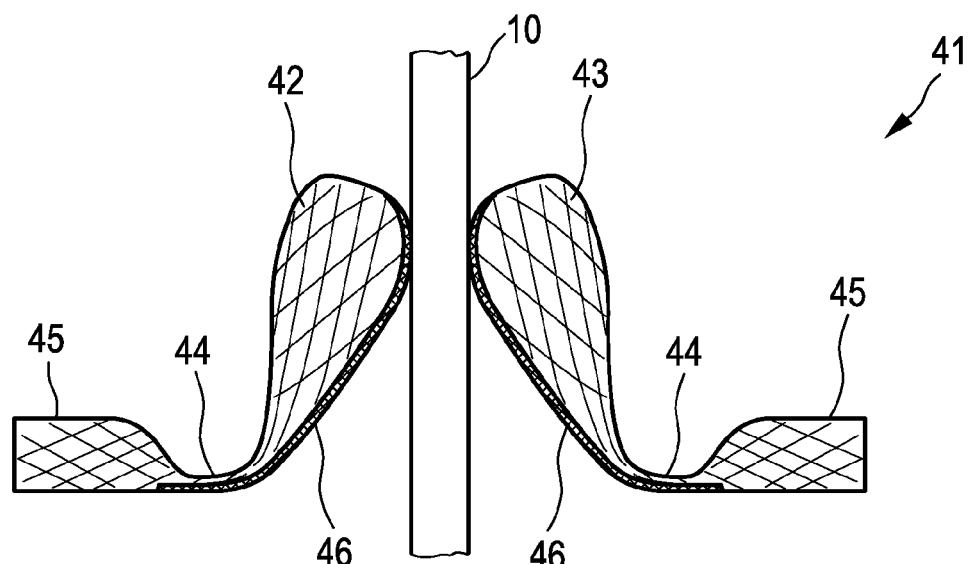
FIG. 7 represents schematically a view in cross-section according to the line VII-VII in FIG. 5 of an automobile part according to the invention in interaction with a mobile unit.

With reference to FIGS. 5 to 7, a fourth automobile part for acoustic screening according to the invention is designated as 41 as a whole.

The automobile part 41 is represented in interaction with a mobile unit 10 such as a pedal lever, for example a pedal lever of a clutch or brake, a pull cable, or any similar unit which is mobile in translation or in rotation.

The automobile part comprises two thick lips 42 and 43 which encompass the pedal lever 10. These thick lips 42 and 43 are formed by cutting material via a slit which ends in at least one transverse conformation, for example a conformation in the shape of a "V". The assembly thus cut is conformed to provide good flexibility during the displacement of the pedal lever 10, whilst ensuring the acoustic sealing on both sides of the pedal lever 10.

The central area of these thick lips 42 and 43 corresponding to the slit part has a very low density: it advantageously corresponds to a non-compressed felt, preferably a needled felt with polyester bonding fibres and polyester filling fibres. This material is advantageous in that it permits easy recycling after use and reinsertion in a production process.

The central area corresponding to the lips 42 and 43 is bordered by a first compressed peripheral area 44.

The first peripheral area 44 is compressed so as to constitute a hinge or an articulation which permits pivoting and opening upwards of the lips 42 and 43 during the displacement of the pedal 10.

By way of example, the central area corresponding to the slit part and to the lips 42 and 43 has a thickness of between 5 and 20 mm, whereas the compressed area 44 has a thickness of approximately 1 to 2 mm.

The first peripheral area or peripheral border 44 which forms an articulation of the central area is bordered by a second compressed peripheral area 45, typically with a thickness of between 2 and 5 mm.

This second peripheral area 45 can be used to secure the automobile part 41 according to the invention in position.

Since the lips 42 and 43 are flexible and correspond to a non-compressed felted part, they are also flexible laterally, such that the sealing is effective on both sides of the pedal lever 10, as can be seen in FIG. 6.

Thus, the flexible lips 42 and 43 are deformed transversely at the passage of the pedal lever 10, and reclosed after the passage of the pedal lever 10.

In FIG. 7, the automobile part for acoustic screening according to the invention comprises a fine skin 46 which extends under the bottom and on the inner edges of the lips 42 and 43, coming into contact with the pedal lever 10.

This fine skin 46 is a rigidified skin in order to have an anti-abrasion function during the movement of the pedal lever 10 in contact with the lips 42 and 43.

This rigidified skin 46 has a thickness typically of between 0.2 and 0.6 mm, so as to permit good resistance of the lips 42 and 43 in contact with the pedal lever 10, and to prevent fraying of the lips 42 and 43 by the friction of the pedal lever 10.

This fine skin 46 is deformed slightly in contact with the pedal 10, in order to have rounding as shown in FIG. 7, whereas it resumes an angular form at the rear and at the front of the pedal lever 10, thus closing the gap between the thick lips 42 and 43.

Thus, during the displacement of a mobile unit, for example the pedal lever 10, the anti-abrasion skin 46 has sufficient flexibility to adapt to the contour of the pedal lever 10, and to allow the thick lips 42 and 43 to be reclosed on both sides of this pedal lever 10.

The sliding of this fine skin 46 on the mobile unit 10 thus prevents damage to the outer and lower parts of the thick lips 42 and 43, corresponding to a felt which is not compressed on its surface.

Figure 8:
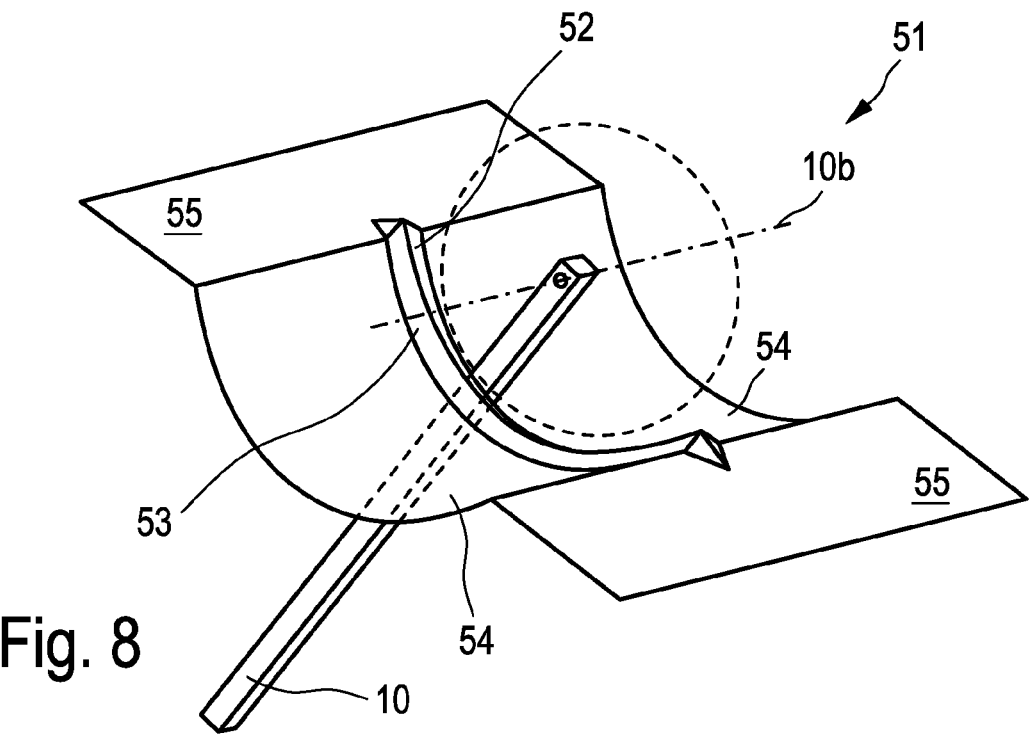
FIG. 8 represents schematically a view in perspective of a fifth automobile part according to the invention in interaction with a mobile unit.

In FIG. 8, a fifth automobile part for acoustic screening according to the invention made of fibrous material, seen in transverse cross-section, is designated as 51 as a whole.

The automobile part 51 is represented in interaction with a mobile unit 10 such as a pedal lever, for example a pedal lever of a clutch or brake, a pull cable, or any similar unit which is mobile in translation or in rotation.

The automobile part 51 has a slit central area, with two thick lips 52 and 53, with very low density and advantageously corresponding to a felt which is not compressed.

The central area corresponding to the lips 52 and 53 is bordered by two cylindrical edges 54 made of compressed material.

The two cylindrical edges 54 made of compressed material are prolonged laterally by two rims 55.

By way of example, the central area corresponding to the slit part and to the lips 52 and 53 has a thickness of between 5 and 20 mm, whereas each cylindrical edge 54 made of compressed material has a thickness of approximately 1 to 5 mm.

Each rim 55 can be used to secure the automobile part 51 according to the invention in position.

In the case of a mobile unit 10 which is fitted such as to rotate around an axis 10*b*, the central axis of the cylindrical forms 54 is selected on the axis 10*b*, in order to avoid any radial force on the low-density lips 52 and 53, and thus to prevent their fraying, their deformation, and/or deformation of the automobile part 51 according to the invention.

Thus, by making the trajectory of the point of contact of the unit correspond to the curvature of the flexible edges 52, 53 of the screen 51 in contact with the unit 10, the relative movement between the unit 10 and the low-density lips 52 and 53 takes place with a constant radius.

The forces perpendicular to the surface of the screen 51 are thus cancelled out, such that any risk of folding or radial deformation of the flexible edges 52, 53 of the screen 51, and of the screen 51 itself, are prevented.

It will be appreciated that the invention applies to any sort of fibrous material, in particular of the felt type, whether needled or not, comprising a single component or comprising a plurality of components with bonding fibres or filling fibres.

The essential thing is to be able to produce the automobile part according to the invention in a single piece from a blank of a material prepared previously, so as to simplify the production and prevent any problem of assembly of two different parts, thus eliminating the disadvantages of the prior art.

The fact of providing compressed areas and non-compressed areas makes it possible to modulate the properties of acoustic sealing and acoustic screening according to the sound properties required in the passenger compartment.

The automobile part for acoustic screening according to the invention can also be adapted to the sound signature of the engine compartment, in order to attenuate the signature in the manner selected by the automobile manufacturer, or as required by the client.

The invention applies to all types of acoustic screen with passage of a fixed or mobile unit, so as to achieve properties close to those of the automobile parts for acoustic insulation which do not have passage of a fixed or mobile unit or a cable.

It will be appreciated that the invention applies to all sorts of material of the felt type, whether needled or not, comprising a single component or comprising a plurality of components with bonding fibres or filling fibres.

The essential thing is to be able to produce the automobile part according to the invention in a single piece from a blank of a material previously prepared, so as to simplify the production and prevent any problem of assembly of two different parts, thus eliminating the disadvantages of the prior art.

Figure 9:
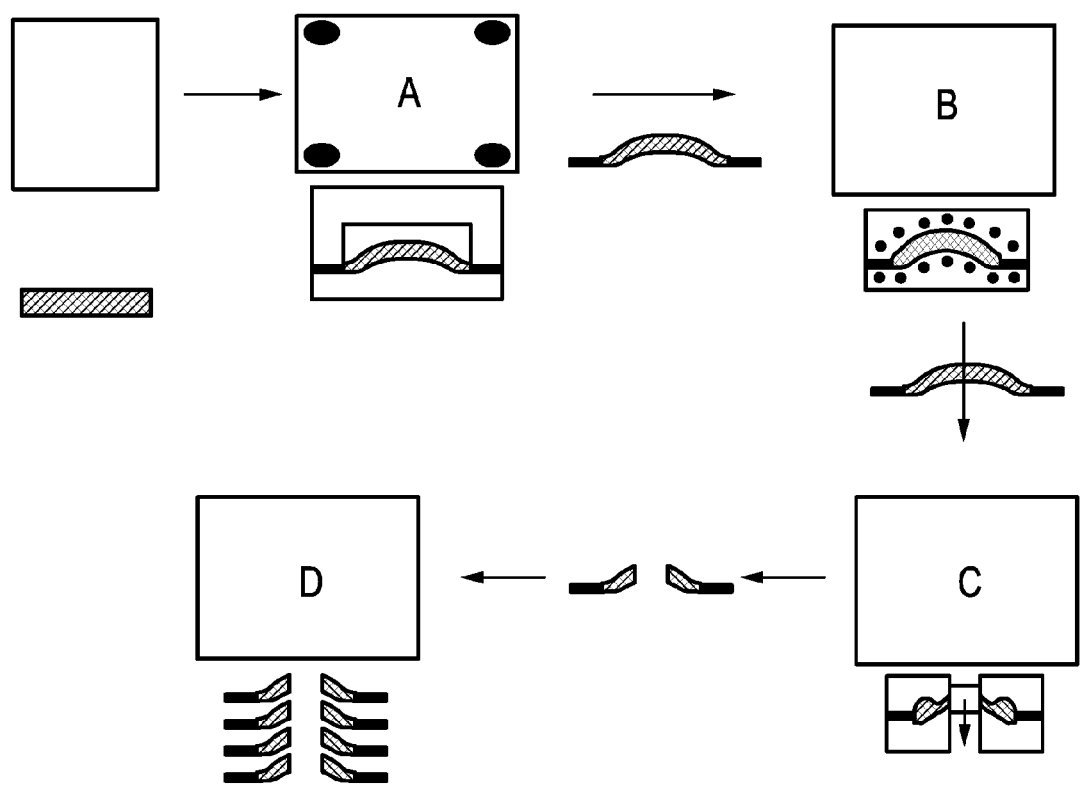
FIG. 9 represents schematically a series of production steps illustrating a production process according to the invention.

In FIG. 9, a production line is represented schematically.

The production process begins in step A by placing a blank of material in a hot mould comprising a hollowed central upper part in order to avoid compressing the central part of the blank.

The hot moulding of the blank forms peripheral areas which are compressed and thermoformed to predetermined values imposed by the form of the hot mould.

In order to create an angle between the low-density area and the compressed and thermoformed peripheral areas, and force the contact between the flank of material and the hot tool on a single side only, the central lower part of the mould has a central protuberance which provides unilateral thermoforming.

The thermoforming time of the part is selected so as to heat only the surface of the low-density area, whilst being sufficient to consolidate the adjacent compressed part of the screen.

The part inserted in the hot mould comprising a hollowed central part to avoid compression of the central part of the part is provided with borders which are compressed and thermoformed at predefined areas comparable to the areas described with reference to FIGS. 2 to 8.

Upon output from the hot moulding, the automobile part in the form of a blank with compressed and thermoformed areas still does not have any slit or any free inner lip.

After hot forming in the mould, the process continues with rapid removal from the mould and transfer. This step of rapid removal from the mould and transfer is preferably executed in an interval of time which is less than 30 seconds, and advantageously approximately 15 seconds.

The part which has been removed from the mould and transferred is then placed in a step B in a cooled cold die and is then maintained for a predetermined duration corresponding to cooling which is sufficient to rigidity the part and provide it with a definitive form. After output from the cold die, the part becomes a part with compressed and thermoformed areas.

After output of the cold part, the process continues in a step C of production of the slits corresponding to the creation of lips which are or are not contiguous in the central, non-compressed area of felt. This production of the slits can be carried out by cutting by means of a blade, a cutting tool by shearing, by a laser, a jet of water or any other appropriate cutting means.

The central groove and the transverse grooves can be created simultaneously in the part.

The slit(s) in the central area of felt which is not compressed can open towards the exterior or the edge of the part.

Finally, the process ends in the step D of packing and packaging the automobile parts for acoustic screening according to the invention ending in containers or delivery packages, before delivery to an automobile manufacturer's site.

The invention described with reference to a particular embodiment is in no way limited to this, but on the contrary covers any modification of form and any variant embodiment within the context and spirit of the appended claims.

The essential thing is to provide lips with a very low density around a mobile unit such as a pedal lever or around a fixed unit such as a control cable.

An anti-abrasion function prevents the deterioration of the mobile lips which are not compressed, by fraying or driving, when they are in contact with a through unit, in particular by constituting a low-thickness anti-abrasion rigidified skin in contact with the mobile unit to be surrounded.

What is claimed is:

1. An automobile part for acoustic screening made of fibrous material with different areas of density or rigidity, and comprising at least one passage through the automobile part, the passage having a low-density area adapted to accept a fixed or mobile through unit, wherein the low-density area comprises flexible lips delimited by a longitudinal groove ending in two transverse grooves.

2. The automobile part according to claim 1, wherein in the lips are adapted to contact the through unit.

3. The automobile part according to claim 2, wherein the lips are in tangential contact with the through unit, and wherein the lips have an angle which imposes the direction of their deformations during the movement of the through unit.

4. The automobile part according to claim 1, wherein the through unit is a rotary mobile unit, wherein the passage further comprises a portion employing a cylindrical curvature, the central axis of the portion corresponding substantially to the axis of rotation of the rotary mobile unit.

5. The automobile part according to claim 1, wherein the low-density area is bordered by the fibrous material compressed to a density greater than that of the low-density area.

6. The automobile part according to claim 5, wherein the compressed area with a density greater than that of the low density area comprises an area of articulation of the lips.

7. The automobile part according to claim 1, wherein the automobile part for acoustic screening further comprises an anti-abrasion skin configured to contact the through unit.

8. A process for production of an automobile part for acoustic screening according to claim 1, comprising a step (A) of hot moulding of a blank of material, wherein the hot moulding of the blank is carried out in a mould with a hollowed central part.

9. The process according to claim 8, wherein the hot moulding of the blank is carried out in a mould with a central protuberance.

10. The process according to claim 8, wherein the process comprises a step (B) of cooling in a die which fixes the definitive form of the part during the cold cooling.

11. The process according to claim 8, wherein the process comprises a step (C) of cutting of slits in the low-density area situated at the passage.

12. The automobile part according to claim 1, wherein the fibrous material is comprised of felt made of thermoplastic material, comprising substantially filling fibres and bonding fibres.

13. The automobile part according to claim 12, wherein the bonding fibres are selected from a group comprising: single-component fibres or two-component fibres, wherein the components can be a polyester, in particular a polyethylene terephthalate (PET), a polyolefin, in particular a polypropylene or a polyethylene, a polylactic acid (PLA) or a polyamide (PA), in particular a polyamide 6 or a polyamide 6.6.

14. The automobile part according to claim 12, wherein the percentage of the bonding fibres relative to the total weight of the material is preferably between 20 and 100%.

15. The automobile part according to claim 12, wherein the filling fibres are selected from a group comprising: synthetic fibres and/or natural fibres, preferably fibres which are recycled or derived from a material obtained from a recycling process.

16. The automobile part according to claim 15, further comprising recycled fibres selected from the group comprising: a reprocessed cotton, a reprocessed synthetic material, a reprocessed polyester or reprocessed natural fibres.

17. The automobile part according to claim 16, wherein the reprocessed natural fibres represent at least 51% by weight of the filling material, whereas 49% of the filling material can be composed by fibres derived from other sources.

18. The automobile part according to claim 1, wherein the fibrous material comprises short fibres.

19. The automobile part according to claim 1, wherein the fibrous material comprises filaments of an unspecified length.

20. The automobile part according to claim 1, wherein the automobile part is constituted by a two-component polyester comprising bonding fibres and a polyester filling.

21. The automobile part according to claim 1, wherein the low-density area is subjected to unilateral thermoforming on a single side.

22. The automobile part according to claim 1, wherein the automobile part is constituted by a felt with an initial mass surface density of between 500 and 1500 g/m$^2$.

23. The automobile part according to claim 1, wherein the automobile part has a thickness of between 5 and 20 mm in its inflated state, and which can be compressed to a thickness of approximately 1 to 5 mm.

* * * * *